June 29, 1965  J. W. HANNAH  3,191,315
TEACHING MACHINE

Filed Nov. 30, 1961  5 Sheets-Sheet 1

FIG. I

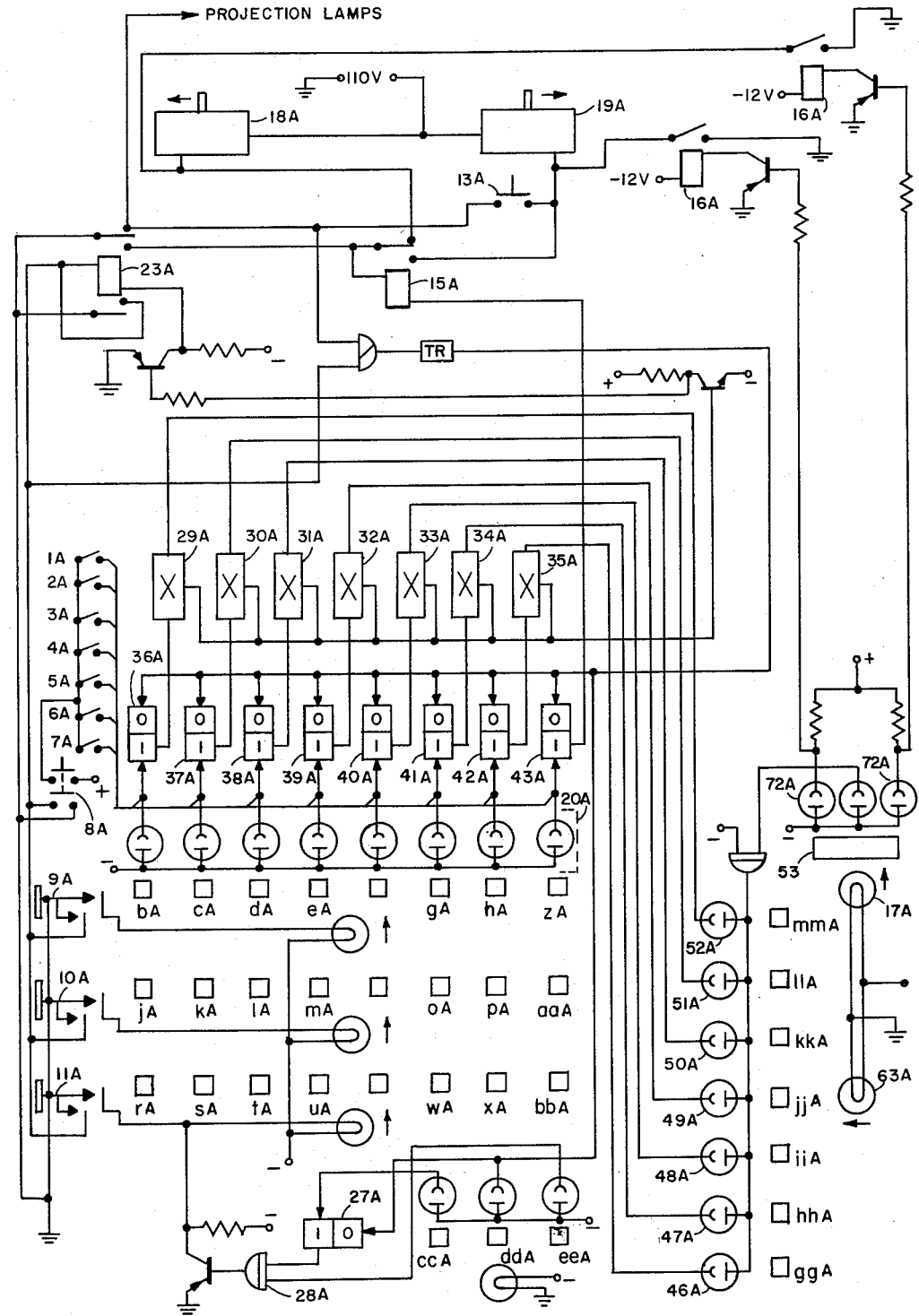

United States Patent Office 3,191,315
Patented June 29, 1965

3,191,315
TEACHING MACHINE
Jack W. Hannah, 653 Cherry St., Galion, Ohio
Filed Nov. 30, 1961, Ser. No. 155,931
14 Claims. (Cl. 35—9)

This invention relates to a self-operated teaching machine that will automatically select a series of lessons for the operator-student. More particularly, this invention relates to a teaching machine that will select a subsequent lesson that corresponds with the student's response to the next previous lesson. Specifically, the device of this invention relates to a machine for the presentation of lessons that are coded with information which determines what the next presentation will be, depending on the response of the student.

In recent years it has become apparent that the conventional textbook and lecture method of classroom teaching embodies certain disadvantages and limitations. For example, it has been found that the classroom method of teaching cannot be equated to the needs of the individual student unless a strong teacher-student relationship is established. With the shortage of trained teachers, it is practically impossible to attain this goal. Moreover, a less advanced student may be retarded rather than stimulated by competition with his more advanced classmates. It has also been found that ordinary teaching methods make little or no allowance for the ability of a given student. Instead, each student is required to follow the same curriculum. For some students, this will merely constitute a review of prior knowledge before any stimulating learning activity is achieved. In this manner, it can be seen that the student will adopt a passive attitude toward learning rather than being stimulated toward eventual mastery of a subject.

To develop an active student attitude, several attempts have been made recently to develop automatic self-tutoring and testing devices that will perform the function of the teacher along the desirable lines of the instructor-student relationship. Many such machines, however, have met with very little success because of their complexity and expense and the difficulty experienced by the average student in mastering their operation. Several other well-known machines are objectionable since they can only be used once and are adaptable only to a very limited range of subjects. Moreover, many prior art machines are designed to employ only a single teaching method and cannot, therefore, be used for both instructing and testing.

Various other well-known teaching devices have been employed, using dials and indicators to present questions. The student will answer these questions by manipulating other dials and indicators. This type of teaching machine will then indicate when the answer to a particular question is correct by a suitable warning device. Machines of this type are undesirable since they require considerable manipulation on the part of the student. Moreover, these machines are more or less restricted as to the range of subject matter and the number of questions and answers that can be handled at one time. Considerable time and expense are required when a machine of this type is to be converted to include new subject matter.

It is therefore a principal object of the instant invention to provide a self-operated teaching machine that will automatically selected a series of lessons for the operator-student.

It is another object of this invention to provide a teaching machine that will select a subsequent lesson that corresponds with the student's response to a previous lesson.

Another object of this invention is to provide a teaching machine for the presentation of coded lesson material to determine what the next presentation will be, depending on the response of the student.

It is another object of this invention to provide a teaching machine that will encourage an active attitude on the part of the student toward the mastery of a particular field of learning.

It is another object of the present invention to provide a teaching aid which is of rugged construction, simple in operation, and inexpensive in maintenance.

Still another object of this invention is to provide a teaching machine that may be easily adapted to present any desired subject matter.

It is still another object of this invention to provide a teaching machine that may present subject matter according to any desired teaching method.

It is a further object of this invention to provide a teaching machine which may be controlled to permit acceptance of a specific range of answers and to provide for a range of responses to either multiple choice or specific situations.

It is a further object of the instant invention to provide a teaching machine that will lead a student to master the subject matter presented by providing reference material to assist in studying a lesson or to correct a wrong answer; and by providing new subject matter when an answer is correct.

It is another object of this invention to provide a teaching machine wherein the subject matter and question-answer response is readily and easily projected from a film source onto at least one viewing window for the student's benefit.

A further object of this invention is the provision of a teaching machine that will overcome the disadvantages inherent to prior art devices.

In accordance with this invention, a teaching machine is provided which visually presents a series of lessons, designed to instruct an operator-student in a particular subject. Each lesson is projected on a screen and may be accompanied by appropriate reference material projected on a neighboring screen. The lessons are contained on photographic film, each individually projected lesson being termed a frame. Accompanying each frame on the film is an area containing holes coded to detect the student's response to a particular lesson and to present the next lesson which is appropriate in terms of the response.

There are three types of responses which can be detected for determining the next lesson presentation: (1) the student's attempt to choose the correct answer from a set of multiple-choice questions; (2) the student's preference for one of two correct statements; (3) the logical sequence of the student's preference selections mentioned in (2). A successful process of learning with this ma-machine is achieved by working through a series of lessons of lessons to the end, since wrong answers or illogical sequences of preference selections return the student to any particular earlier stage of the lesson series that is required to re-instruct him for successful mastery of the lessons he failed.

The objects and advantages of the device of this invention will be more clearly understood with reference to the drawings, in which:

FIGURE 9 is another schematic diagram of the electrical circuit employed in the present invention.

Like reference numerals indicate like parts throughout the several figures of the drawings.

Figure 1:
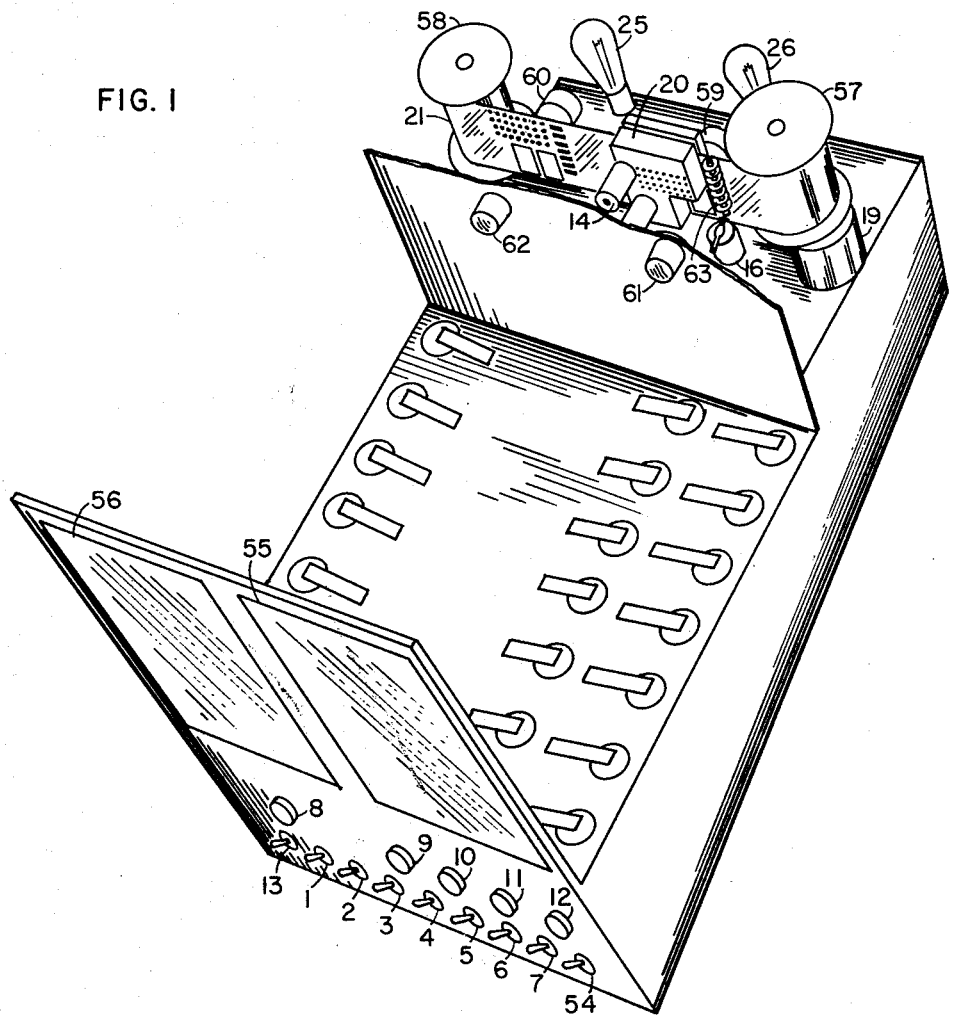
FIGURE 1 is a pictorial view of the teaching machine according to this invention, with the cover removed.
Figure 4:
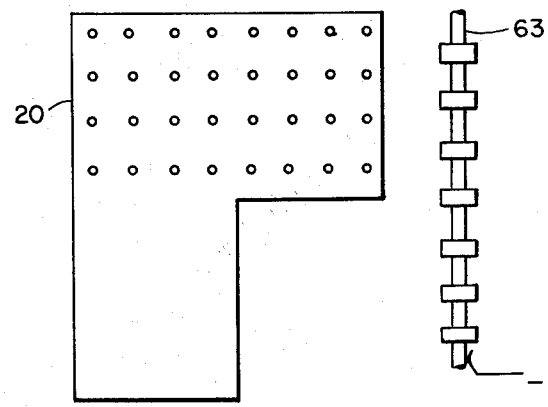
Figure 5:
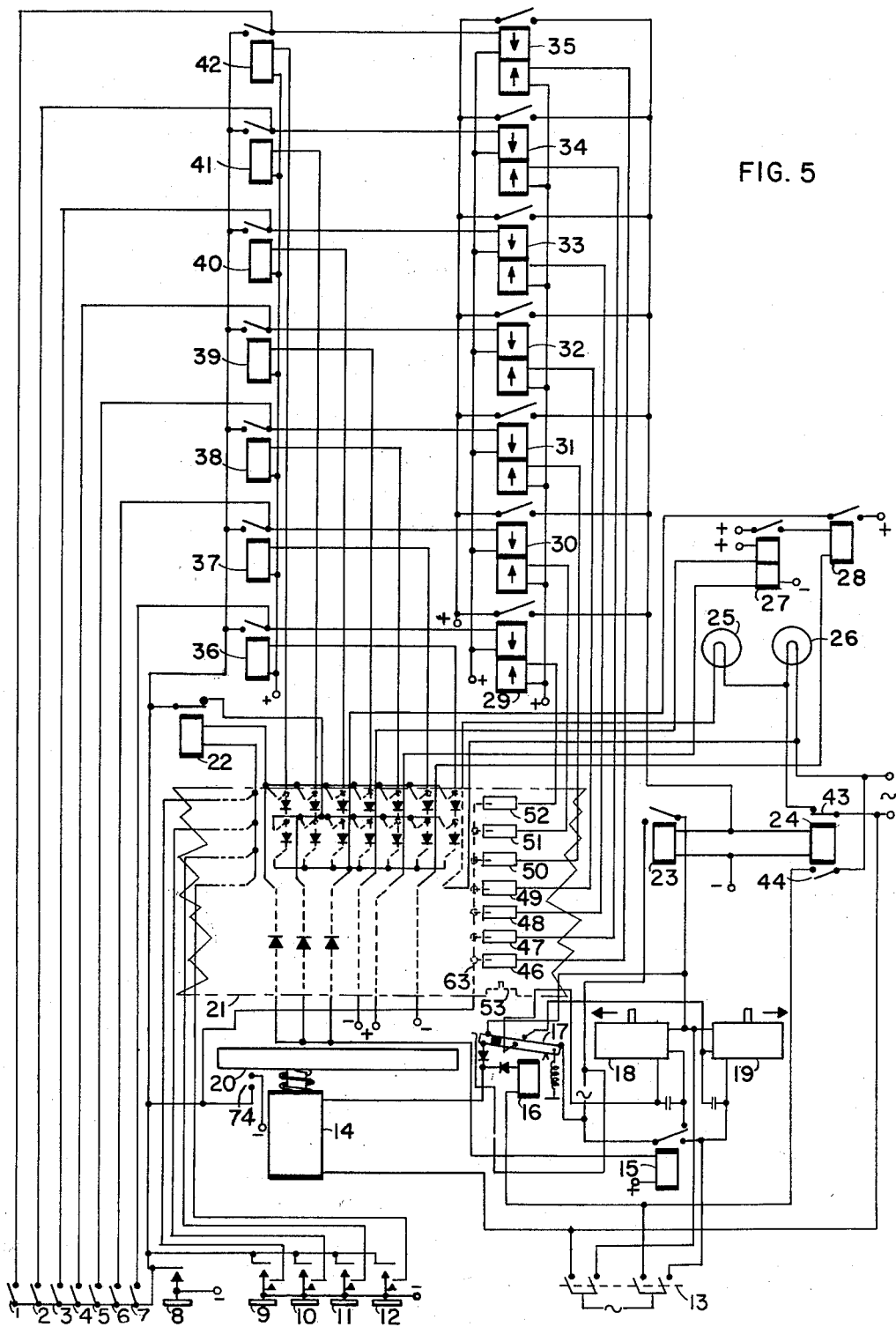
FIGURE 5 is a simplified schematic diagram of the electrical circuit of the teaching machine according to this invention.

Referring now to FIGURE 1, the device of this invention will be started by first placing a reel 57 containing a lesson series on a spindle driven by a motor 19. Film 21 (see FIGURES 1, 2 and 5) is taken from the reel and guided through contact wheels 63 and reader block 20 and onto the winding reel 58 driven by another motor 18 (see FIGURE 5). The power is turned on by means of switch 54. The first frame 68, 67 (see FIGURE 2) of a series is identified as number one. However, the student who has been using this particular lesson series previously may wish to start at some advanced frame and therefore must know the identification number assigned to that frame. The identification number is placed on throw switches 1 through 7, and setting pushbutton 8 is depressed. This action provides direct current to actuate corresponding comparator relays 29 through 35 (see FIGURE 5). Whenever any comparator relay is actuated such that its contact closes, current is sent to operate relays 23 and 24. When relay 24 is operated, contact 43 (see FIGURE 5) is opened, turning off the projection lamps 25 and 26; contact 44 is closed which provides current to operate the solenoid 14, pulling the reader block 20 from the surface of the film 21; this source of current also activates relay 16, pulling the positioning bar 17 away from the bottom edge of the film 21. As solenoid 14 is activated, it closes contact 74, which provides a new source of direct current through switches 1 through 7 so that pushbutton 8 may be released. When relay 23 is closed, current is directed through forward winding motor 18, moving film 21 onto reel 58. As the film moves, current from metal rollers 63 (see FIGURES 1, 4 and 5) passes through any of the coded areas gg through mm in film 21 (shown in FIGURES 1 and 2) that register with positions 46 through 52 in block 64. The coded areas gg through mm on the film may consist of electrically conductive inserts, punched holes, or light transparent areas, depending on whether the machine uses direct electrical contact through the coded areas or a light beam activating photoelectric cells. Where current can pass from metal rollers 63 through a slot, it is directed to actuate the comparator relay, 29 through 35 (see FIGURE 5), that corresponds with the slot in question. As shown in FIGURE 5, each comparator relay is counter-wound with two sets of windings so that relays actuated through any of the switches 1 through 7 (see FIGURE 5) will not magnetically retain their respective armatures when they are also actuated from current through identification slots 46 through 52. That is, the current in each winding opposes and nullifies the magnetic forces of the other. Only in the instance where the identification slots gg through mm exactly match the input from switches 1 through 7 at points 46 through 52, will current cease to be passed to relays 23 and 24, thereby releasing them.

Figure 7:
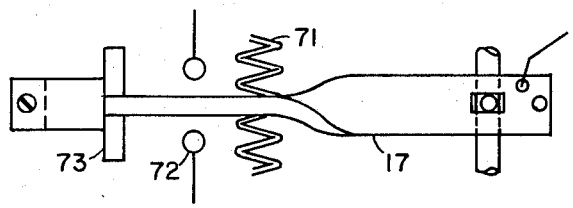
FIGURE 7 is a top view of the switch device of FIGURE 6.
Figure 6:
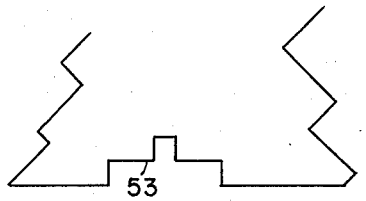
FIGURE 6 is a front elevational view of the switch used to position a lesson frame in the teaching machine by means of a registration slot.
Figure 8:
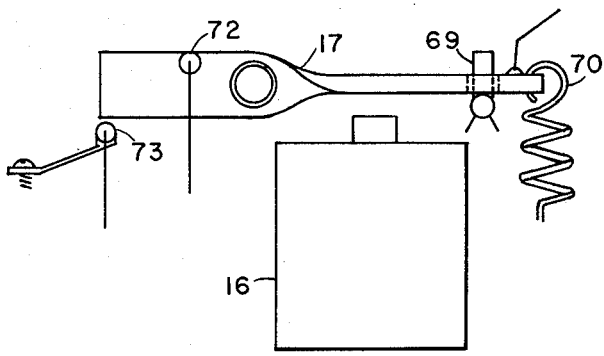
FIGURE 8 is a side view of the switch device of FIGURE 6.

When relay 24 is released, contact 44 opens, releasing relay 16 which, in turn, permits positioning bar 17 to engage the lower level of the registration slot 53 (see FIGURE 6) in film 21 by means of tension spring 70 (see FIGURE 8). The source of power to winding motor 18 is shut off when relay 23 is de-energized, but the motor and the film will continue to drift. This movement causes positioning bar 17 to be moved horizontally (see FIGURES 6 and 7). As it does so, it closes one of the two contacts 72 on the side toward which it is moved by the drifting film. This contact causes a surge of current to be directed to the motor, which momentarily reverses it, stopping the drift. As shown in FIGURE 7, positioning spring 71 generally retains bar 17 in horizontal alignment. When the positioning bar 17 is finally aligned midway in registration slot 53 in the lower edge of film 21, it slips away from contact 73 and into the higher level (see FIGURES 6 and 8) of the slot 53, breaking all source of power to the winding motors and to solenoid 14. Solenoid 14 is released and reading block 20 is pressed firmly against the surface of the film (see FIGURES 1, 3, 4 and 5). Contact 43 has also closed, which turns on projection lamps 25 and 26. Lesson frames 68 and 67 (see FIGURE 2) are then projected onto ground glass screen 55 (see FIGURE 1).

As shown in FIGURE 1, the projection equipment consists of ground glass screen 55, projection lens 61, condenser lenses 59, and projection lamp 26. The reference frame for any particular lesson frame is located several frames away from the lesson frame and is projected onto adjacent ground glass screen 56 by projection lamp 25, condenser lenses 60 and projection lens 62.

In review, film reel 57 is first placed on a spindle driven by motor 19. The film is then moved until a desired lesson frame has been first identified and then exactly positioned. When the desired lesson frame is finally presented on the screen, the student throws switches 1 through 7 to the "off" position.

Figure 2:
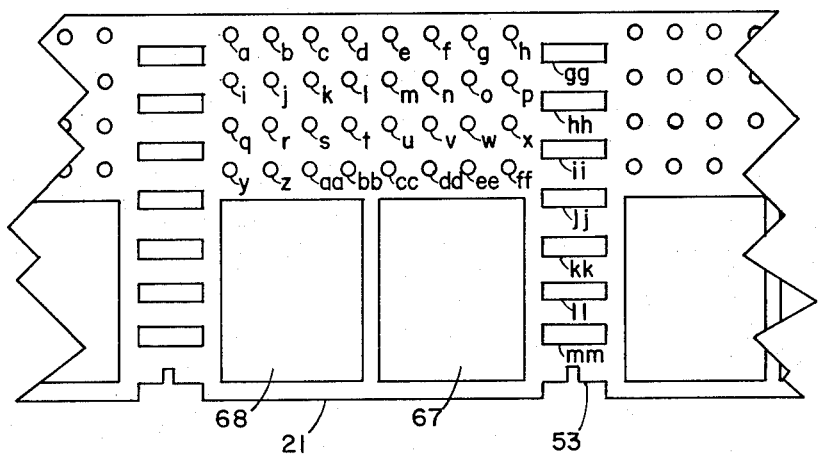
FIGURE 2 is a front elevational view of a section of coded photographic film for use in the device of this invention and showing one lesson frame.
Figure 3:
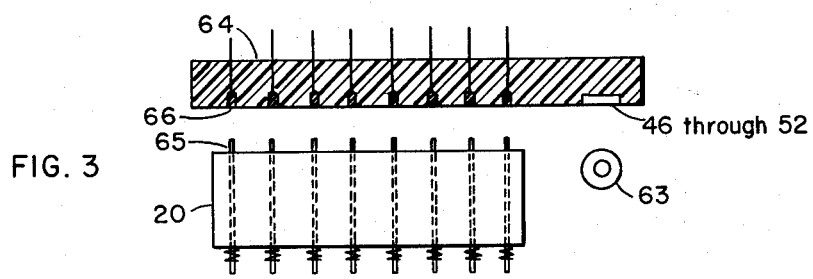
FIGURES 3 and 4 show top and end views of the reader block and contact wheels which provide the means for directing an electric current through the coded lesson frame.

The particular lesson presented may end with a problem for the student. For example, the problem may contain four answers, only one of which is correct. The student will then depress one of the pushbuttons, 9 to 12, which he believes corresponds to the correct answer. As shown in FIGURE 5, each of these pushbuttons has two contacts, the first making contact before the second. Leads 65 (see FIGURE 3 and dark lines in FIGURE 5) from the first contact of these pushbuttons are directed to the column on the lesson frame (see FIGURE 2) containing coded areas a, i, q, and y. These coded areas, like coded areas gg to mm, may comprise punched holes, electrically conductive inserts or light transparent areas. If the student selects the correct answer, a hole in the film will exist for the lead 66 from the corresponding pushbutton. Current will pass through this hole from lead 65 to contact point 66 (see FIGURE 3 and dotted lines in FIGURE 5). When current is permitted to flow, it actuates relay 22, opening the contact above relay 22 (see FIGURE 5) so that no current flows through the contact of relay 22 when the pushbutton is completely depressed to make its second contact (see 9 to 12 in FIGURE 5). The current which actuates relay 22 also passes through whatever holes are coded in locations b through h in the top coded row of the frame (FIGURE 2). Whenever current passes through these holes from lead 65 to contact points 66 in block 64, the current sets the corresponding register relays 36 to 42. These relays are so constructed that once actuated they remain set until their residual magnetism is neutralized. The contacts of the register relays 36 to 42, which are closed, deliver current from the second contact of any depressed pushbutton 9 to 12 to energize the corresponding comparator relays 29 to 35. The frame indicated by the code in locations b through h is found and projected in the same manner as already described for setting the initial frame. If the answer chosen by the student is incorrect, the lead 65, actuated by the first pushbutton contact, will not find a hole at its location on the film and relay 22 will remain unoperated. Therefore, as the pushbutton makes its second contact (again see 9 to 12 in FIGURE 5), current will pass through the contact controlled by relay 22 and will be directed to the second row through whatever holes are provided at the coded locations j through p of the film. This current sets the corresponding register relays which, in turn, energizes the proper comparator relays, and as described, the film will be moved until the frame indicated by the code in locations $j$ through $p$ is found.

It may be that the frame to be found is in a location which is prior to the frame being used by the student. In this case, the film must be moved in a reverse direction in order that the desired frame may be detected. When this situation arises, a reversal hole will exist in frame location $z$ for row $b$ through $h$, or in location $aa$ for row $j$ through $p$, or in location $bb$ for row $r$ through $x$. When one of these rows passes current, a portion is also directed through its reversal hole $z$, $aa$ or $bb$, which actuates relay 15. When relay 15 is set, reverse winding motor 19 will operate instead of forward winding motor 18.

Another type of lesson may end by directing the student to choose which of two equally correct statements is more meaningful to him. In this way, the next lesson presented can be more related to his particular interests or ability to comprehend. According to his preference, the student depresses either pushbutton 9 or 10. The lead from one of these pushbuttons will have a hole in the film at location $a$ or $i$ so that depressing one of the pushbuttons will provide current through the code located in holes $b$ through $h$, while depressing the other pushbutton provides current through holes coded at locations $j$ through $p$. The action of the machine is exactly the same as described for the situation where the student answers a problem.

Where a student has opportunity to make several preference selections, his selections may form an illogical sequence. When there is probability of this situation existing, the first lesson of the possible sequence has a hole at coded position $cc$ which permits current to set relay 27. Relay 27 remains set. If a logical selection is made for some subsequent lesson, a hole exists in coded position $dd$ for that lesson which releases relay 27. If the preference selection made at some subsequent lesson definitely is illogical in terms of previous selections, a hole will exist at coded position $ee$ which provides a return path for current from an operated relay 27. This current actuates relay 28 which closes current through whatever holes are coded in row $r$ through $x$. Current through these holes sets corresponding register relays, and the machine, in the manner described, sets up for the student a new lesson which is designed to claritfy the illogical approach he has taken.

A coded area is located at position $ff$ of the frame to control reference projection lamp 25 separately from the lesson projection lamp. When position $ff$ lacks such an area, the reference lamp will not light. This modification is used where a lesson does not require an accompanying reference presentation. As described previously, the coded areas may comprise punched holes, electrically conductive inserts or light transparent areas. In a preferred embodiment, punched holes are employed.

The machine of this invention is provided with a separate rewind switch 13 to enable the student to rewind conveniently the lesson film. It provides a direct source of current to solenoid 14 and motor 19 which is not connected to any other circuitry.

It can be readily seen how the teaching machine of this invention will encourage an active attitude on the part of the student toward mastery of any particular subject matter. By providing reference material on reference frames accompanying many of the lessons, the student is kept in touch with the wide scope of his subject. By providing lesson and reference material in response to an incorrect answer, the student will immediately learn the correct answer, thereby eliminating the ordinary confusion resulting from the retention of incorrect answers. When the student responds with a correct answer, the device of this invention will provide the rewarding sensation of a new lesson. In the case where the response constitutes a preferential selection or the selection of a logical sequence, the teaching machine of this invention will select a subsequent lesson that is commensurate with the student's response. That is, if the response indicates good comprehension, the machine will select a more advanced lesson in the series for the next presentation. If the response is not indicative of good comprehension, the machine will select a more basic series of lessons for presentation to enable the student to attain mastery of the entire lesson series. The device of this invention is only limited by the type of coding or programming that is employed in preparing the lesson frames for each subject.

While a specific embodiment of the device of this invention has been described employing direct electrical contact through the coding positions and magnetic relays, this is done solely for purposes of simplicity of description. It will be obvious to those skilled in the art that this device should not be so limited, but is susceptible to various changes and modifications. For example, the functions of the reading block may be performed with photoelectric cells, the register relays may be transistorized bistable drivers, and the comparator relays may be transistorized "exclusive-or" logic circuits. An example of such a species of the device of this invention is given by the logic-circuit schematic shown in FIGURE 9. Comparison of this figure is invited to be made with FIGURE 5 in order to see how the generic principles of the teaching machine are maintained in another specific embodiment. For purposes of clarification, corresponding or comparable elements are identified with the same reference numbers used in FIGURE 5 except they are accompanied by the suffix "A." In this embodiment the student may select one of three responses by depressing push button 9, 10, or 11. In doing so a corresponding lamp is lit and its light rays pass through transparent areas of the lesson film. Where the light can pass, it is detected by photoelectric cells which cause a potential to be placed on the driving registers indicated as flip-flops 36A through 42A. The outputs of these flip-flops are directed to the exclusive-or comparators numbered 29A through 35A. The output of the exclusive-or circuits is directed through two transistors to relay 23A which controls the film drive motors, either 18A or 19A depending on whether relay 15A is activated. These motors cause the film to move either forward or reverse. As the film travels, the transparent, coded identification areas for each frame, $ggA$ through $mmA$, permit rays from lamp 63A to pass to photoelectric cells 46A through 52A. The output of these cells is directed to the comparator exclusive-or circuits. When a lesson frame is reached which bears a code corresponding to the code given when the student depressed a pushbutton, the exclusive-or circuits all bear coincidence and give no output. Lack of output from the comparator circuits causes relay 23A to open, thereby stopping the film drive motors.

The film drive motor stops the film where the registration slot 53A will be in the vicinity of photoelectric cell 72A. Light from lamp 17A will pass through the registration slot and cause whichever motor that moves the film in opposite direction to that which the film is drifting to be activated. By this procedure the drift is corrected and the film is oscillated to an aligned, stopped position. The projection lamps are turned on by the release of relay 23A and the student proceeds with his next lesson.

In this specific embodiment, the monitoring of an illogical sequence is accomplished in a manner directly corresponding to that already described. The preliminary indication of this sequence is given by a transparent area in the film at position $ccA$. Light through this area is detected by the photoelectric cell which sets flip-flop 27A. If the student carries through with logical responses, the setting of flip-flop 27A is erased by light through a transparent area placed at $ddA$. If the student makes an illogical response, a transparent area exists at $eeA$ which causes its corresponding photoelectric cell to direct a potential to "and" circuit 28A. When "and" circuit 28A simultaneously detects a potential from flip-flop 27A and the photoelectric cell of *ee*A, it produces an output to a transistor that turns on the lamp reading the code in areas *r*A through *bb*A.

The example of these species are not intended as limitations for various obvious modifications, improvements and additions may be made in the electrical circuits and relay connections of this invention without departing from the spirit or scope thereof. It is intended, therefore, that the instant invention be limited only to the scope set forth in the following claims.

What is claimed is:

1. A teaching device comprising means for visually projecting individual frames of a self-contained filmed lesson series and individual frames of reference material corresponding to said lesson series, each of said frames of the lesson series and the reference material containing a coded address and several codes corresponding to subsequent frames to be viewed, and means for automatically selecting and positioning any desired individual frame of the filmed lesson series and the reference material in the teaching device for visual projection by receiving the coded address of said individual frame from the frame being viewed.

2. A device in accordance with claim 1, wherein said means for automatically selecting and positioning any desired frames comprises a film strip containing punched holes.

3. A device in accordance with claim 1, wherein said means for automatically selecting and positioning any desired frames comprises a film strip containing electrically conductive inserts.

4. A device in accordance with claim 1, wherein said means for automatically selecting and positioning any desired frames comprises a film strip containing light transparent areas.

5. A teaching device for visually projecting individual frames of a self-contained filmed lesson series and individual frames of reference material corresponding to said lesson series, including a film, a series of frames on said film, mechanical-electrical direction indication means, mechanical-electrical preferential indication means, said frames provided with areas coded to find and position automatically individual lesson frames and individual reference material frames responsive to said mechanical-electrical direction indication means and areas coded for selecting subsequent lesson frames responsive to said mechanical-electrical preferential indication means and a register-comparator device for matching mechanical-electrical responses to said direction indication means and said preferential indication means.

6. A device in accordance with claim 5, wherein said register-comparator device produces zero electrical output when mechanical-electrical responses to said direction indication means and said preferential indication means are both present.

7. A device in accordance with claim 5 wherein said register-comparator device produces zero electrical output when mechanical-electrical responses to said direction indication means and said preferential indication means are both absent.

8. A teaching device for visually projecting a logical sequence of individual frames of a self-contained film lesson series and individual frames of reference material corresponding to said lesson series in accordance with a student's response to individual lesson frames, comprising a film, a series of frames on said film, a series of coded addresses on said frames, several codes on each of said frames corresponding to coded addresses on other frames in the film, mechanical means to indicate a response to a visual stimulus from a first frame, electrical means actuated by said mechanical means thereby producing a first signal from a coded address on said first frame and a second signal which corresponds to a coded address on a second frame, driving means to advance said series of frames, a register-comparator device to start said driving means upon receiving said first signal from a coded address on said first frame and stop said driving means upon receipt of said second signal through a second frame having a coded address which matches said first frame.

9. The device of claim 8 further including a second mechanical means for activating an electrical signal corresponding to a predetermined coded address, thereby advancing said series of frames to a predetermined frame.

10. The device of claim 8 comprising further means to record the presentation of said series of frames to the student, thereby providing a monitoring function to override said previously presented frames.

11. The device of claim 8 further including a second mechanical means comprising a plurality of switches for activating an electrical signal corresponding to a predetermined coded address, thereby advancing said series of frames to a predetermined frame.

12. The device of claim 8 further comprising means to record the presentation of said series of frames to the student, said means including separate coded areas on a frame responsive to photoelectric cells, thereby providing a monitoring function to override said previously presented frames.

13. A teaching device for visually projecting a logical sequence of individual frames of a self-contained film lesson series and individual lesson frames, comprising a film, a series of frames on said film, each frame containing a coded address and several codes corresponding to coded addresses on other frames in the film, mechanical means to indicate a response to a visual stimulus from a first frame, electrical means actuated by said mechanical means thereby producing a first signal from a coded address on said first frame and a second signal which corresponds to the coded address of another frame to be positioned to be projected and viewed, driving means to move said series of frames past the position where a frame can be projected and viewed, a register-comparator device to start said driving means upon receiving said first signal from a coded address on said first frame and stop said driving means upon receipt of said second signal through a second frame having a coded address which matches said first signal produced at first frame.

14. The device of claim 13 further including a means whereby codes at certain frames initiate signals which register that such a frame has been projected; means whereby at certain subsequently projected frames the presence of another type of code will initiate a third signal which when combined with the registered signals will cause a fourth signal to be automatically initiated, overriding the first signal set in by student's response; and means whereby at other subsequently projected frames the presence of still another type of code will initiate a signal which erases any signal which may be registered.

References Cited by the Examiner

UNITED STATES PATENTS

| | | | |
|---|---|---|---|
| 2,484,642 | 10/49 | Paris. | |
| 2,783,454 | 2/57 | North. | |
| 2,924,889 | 2/60 | Di Lauro | 35—9 |
| 2,937,455 | 5/60 | Perkins et al. | 35—9 |
| 2,940,680 | 6/60 | Danklefs | 242—55.12 |
| 2,973,508 | 2/61 | Chadurjian | 340—149 X |
| 2,990,126 | 6/61 | Royston | 242—55.12 |
| 3,103,073 | 9/63 | Nickl et al. | 35—9 |
| 3,123,920 | 3/64 | Crowder et al. | 35—9 |

JEROME SCHNALL, *Primary Examiner.*

L. SMILOW, *Examiner.*